April 22, 1924.
A. R. JOHNSON
FRUIT HOLDING DEVICE
Filed April 19, 1923
1,491,045
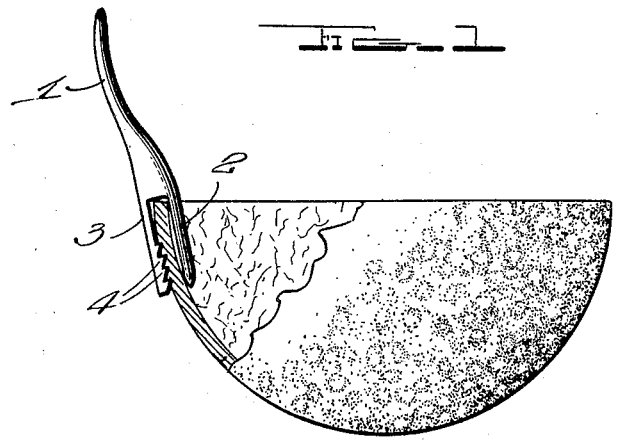
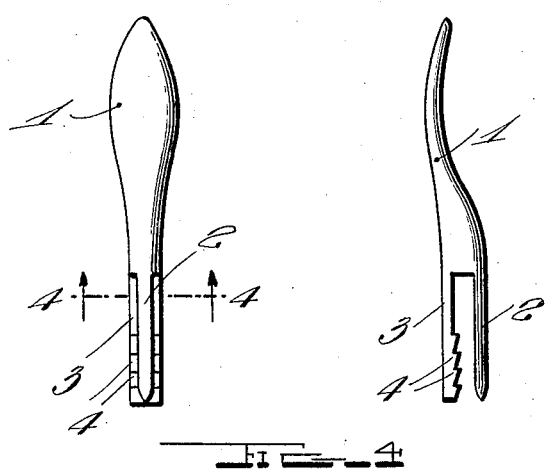
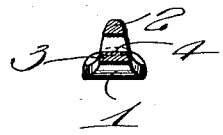
Witness
Inventor
Axel R. Johnson
By H. R. Wilson &co
Attorneys Patented Apr. 22, 1924.

1,491,045

UNITED STATES PATENT OFFICE.

AXEL R. JOHNSON, OF DENVER, COLORADO.

FRUIT-HOLDING DEVICE.

Application filed April 19, 1923. Serial No. 633,173.

*To all whom it may concern:*

Be it known that I, AXEL R. JOHNSON, a citizen of the United States, residing at Denver, in the city and county of Denver and State of Colorado, have invented certain new and useful Improvements in Fruit-Holding Devices; and I do declare the following to be a full, clear, and exact description of the invention, such as will enable others skilled in the art to which it appertains to make and use the same.

This invention relates broadly to a table accessory which may be conveniently designated as a fruit holding device.

The object of the invention is to provide a convenient and unique device or implement for holding fruit such as cantaloupes, oranges, grape fruit and the like with one hand while removing the pulp through the use of a spoon or the like, with the other hand, to obviate the necessity of gripping the fruit with the fingers of one hand and permitting them to become coated with the fruit juice as ordinarily occurs.

More specifically described, it is an object of the invention to provide a very simple and inexpensive device for this purpose having furcations at one end, one furcation of which provides a prong to be embedded in the pulp, and the other furcation of which is provided with teeth for effectively gripping the outer face of the skin of the fruit to insure an effective grip.

Other objects and advantages of the invention will be apparent during the course of the following description.

In the accompanying drawings forming a part of this specification and in which like numerals are employed to designate like parts throughout the same:—

Figure 1 is an elevational view showing the improved holding device engaged with the skin of one half of an orange.

Fig. 2 is a slightly enlarged front elevation of the holding device.

Fig. 3 is a side elevation thereof; and

Fig. 4 is a horizontal section taken on the line 4—4 of Fig. 2, looking in the direction of the arrow.

In carrying out the invention I provide a comparatively small device which may be constructed from any suitable rust-proof material, and the same preferably embodies a handle 1, which is longitudinally curved and flattened and otherwise shaped to provide a convenient grip for the fingers of one hand. At its lower end, the device is increased in thickness to provide a head and this is bifurcated to provide convenient means for connecting the device with the fruit to be held. While this means could be constructed otherwise, it will be seen that the inner furcation 2 is comparatively narrow and has its free end pointed to provide what may conveniently be termed a prong. The remaining furcation 3 is comparatively wider and this furcation is provided on its inner face with a plurality of vertically spaced teeth 4 which, as seen in Fig. 1, are adapted to engage the outer face of the skin of the fruit.

In practice the device may be conveniently used for holding watermelons, cantaloupes, oranges, grape fruit and other fruit having a comparatively thick skin. In using the device, and assuming that it is to be engaged with half of an orange as seen in Fig. 1, it is placed in position so that the furcations straddle the skin. In so doing, the prong 2 becomes embedded in the pulp of the fruit and assists in holding the device in position. The teeth 4 of the other furcation engage the outer face of the skin and an effective grip of the device on the latter is thus provided. By gripping the flat portion of the handle 1 with the fingers of one hand and employing a spoon or the like with the other hand, the pulp can be conveniently removed for eating. Hence, the fingers will not be soiled from the fruit juice which ordinarily accumulates on them and the device will thus be found extremely desirable for both home and public use.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:—

1. A device for holding fruit while removing the pulp thereof with a spoon, comprising a relatively small and short handle to be gripped between a person's fingers, said handle having spaced jaws at its lower ends adapted to straddle the skin of the fruit, one of said jaws being serrated to effectively grip the skin to prevent slipping.

2. A device for holding fruit while removing the pulp with a spoon comprising a handle having a head at one end, said head being bifurcated, said furcations being adapted to straddle the skin of the fruit when the device is in operative position, one of said furcations being shaped to provide a pointed prong adapted to be embedded in the pulp of the fruit, the other furcation being equipped with teeth on its inner face adapted to engage the outer face of the skin of the fruit.

In testimony whereof I have hereunto affixed my signature.

AXEL R. JOHNSON.

Witness:
JOSEPH W. BAXTER.